(No Model.) 4 Sheets—Sheet 1.

H. C. SIMPSON.
WATER WHEEL.

No. 427,629. Patented May 13, 1890.

WITNESSES

INVENTOR (No Model.) 4 Sheets—Sheet 2.
H. C. SIMPSON.
WATER WHEEL.
No. 427,629. Patented May 13, 1890.
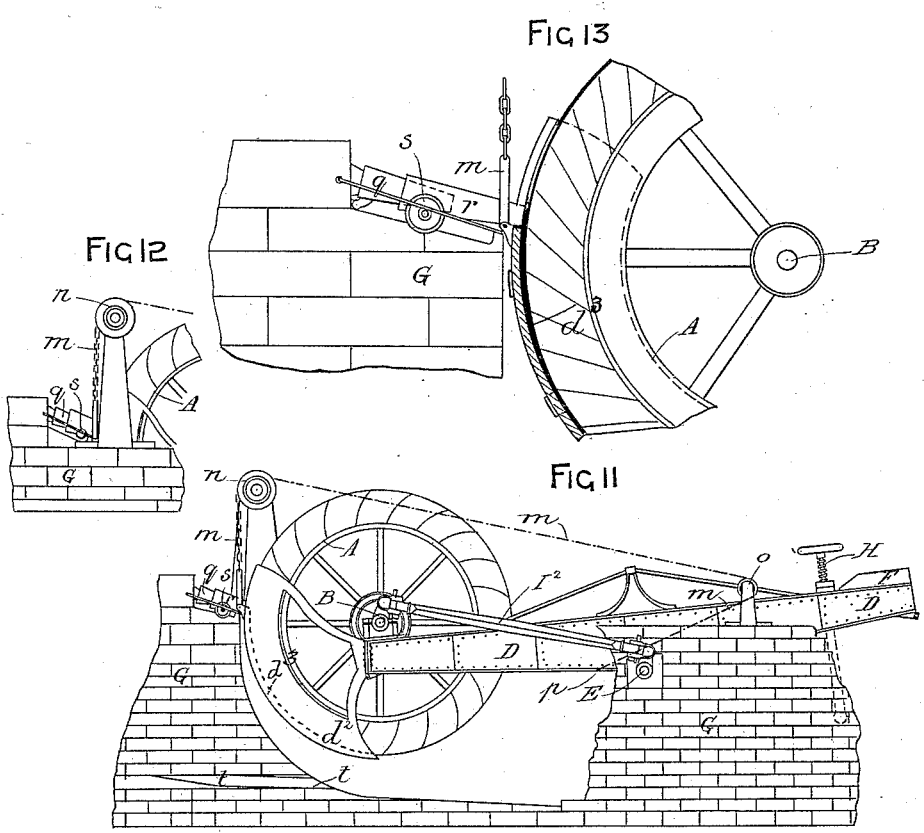

(No Model.) 4 Sheets—Sheet 3.

H. C. SIMPSON.
WATER WHEEL.

No. 427,629. Patented May 13, 1890.

WITNESSES
Charles Bosworth Kelley
Herbert Whitehouse

INVENTOR
Hortensius Foster Simpson (No Model.) 4 Sheets—Sheet 4.

H. C. SIMPSON.
WATER WHEEL.

No. 427,629. Patented May 13, 1890.

WITNESSES
Charles Bosworth Kelley
Herbert Whitehouse

INVENTOR
Hortensius Cools Simpson

UNITED STATES PATENT OFFICE.

HORTENSIUS COATES SIMPSON, OF SHREWSBURY, COUNTY OF SALOP, ASSIGNOR TO THE UNIVERSAL WATER POWER COMPANY, (LIMITED,) OF LONDON, ENGLAND.

WATER-WHEEL.

SPECIFICATION forming part of Letters Patent No. 427,629, dated May 13, 1890.

Application filed April 9, 1889. Serial No. 306,514. (No model.) Patented in England April 26, 1888, No. 6,168.

*To all whom it may concern:*

Be it known that I, HORTENSIUS COATES SIMPSON, a subject of Her Majesty the Queen of Great Britain, residing at Shrewsbury, in the county of Salop, England, have invented certain new and useful Improvements in or connected with Water-Wheels and Paddle-Wheels, of which the following is a specification.

This invention has been patented to me in Great Britain by British Patent No. 6,168, April 26, 1888.

This invention has reference to water-wheels for driving machinery in mills and for other like purposes.

Figure 1:
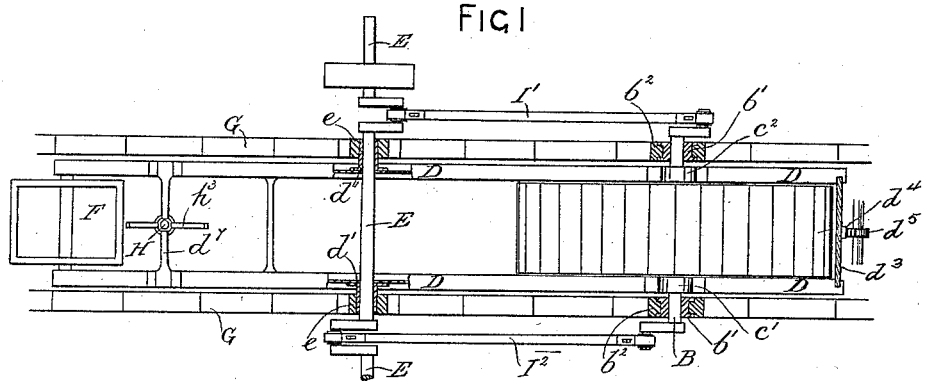
Figure 2:
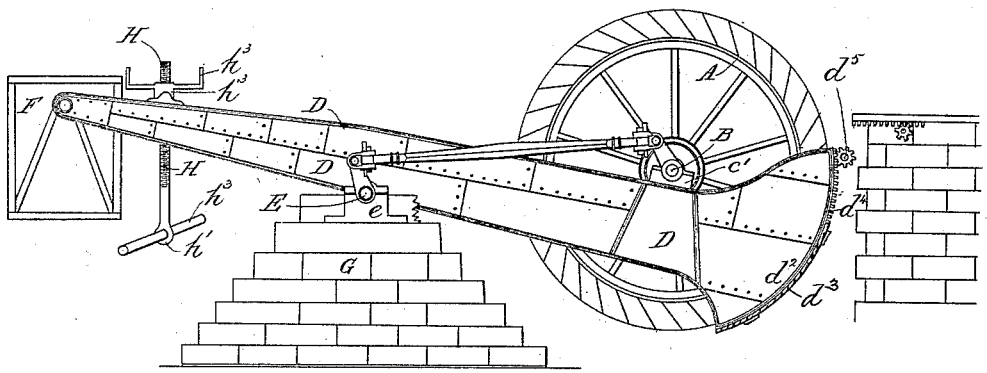
Figure 3:
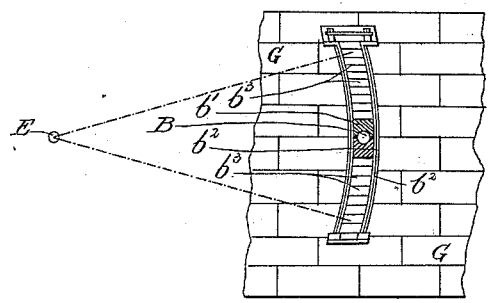
Figure 7:
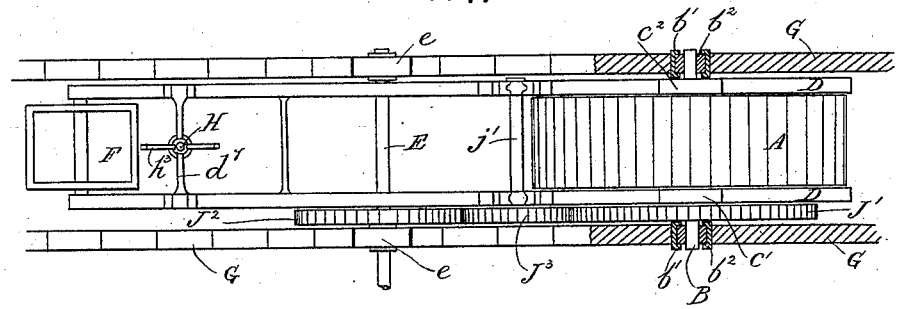
Figure 8:
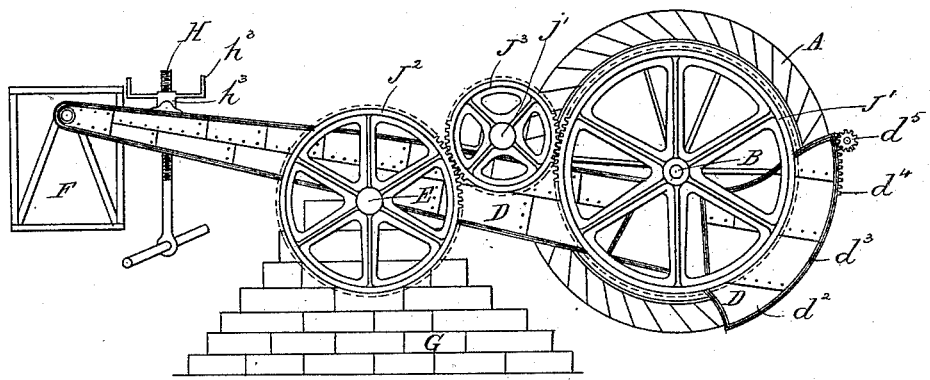
Figure 9:
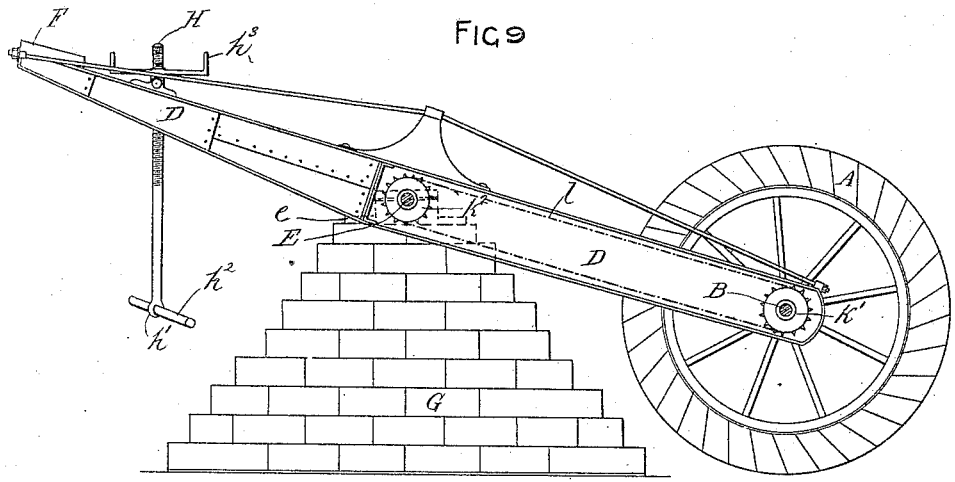
Figure 10:
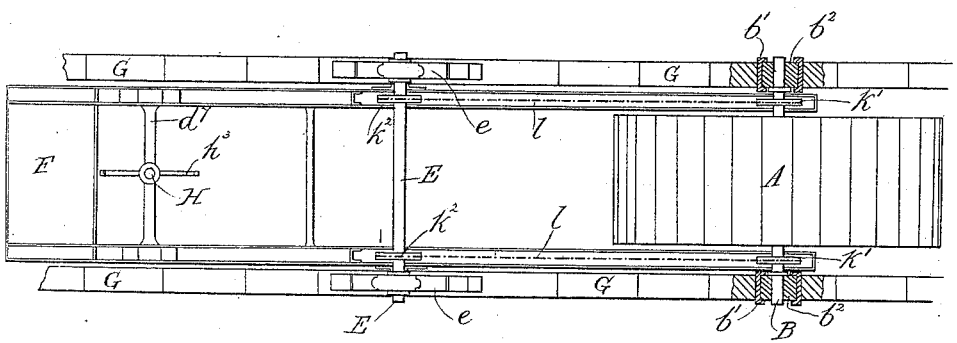

In the accompanying drawings, Figure 1 represents in plan and Fig. 2 in side elevation a water-wheel arranged according to my invention and driving the line-shaft by cranks and connecting-rods. Fig. 3 is one of the wall-bearings for the same. Figs. 4, 5, and 6 illustrate details of the same on an enlarged scale. Fig. 7 is a plan partly in section, and Fig. 8 is a side elevation, of a modification of my invention, in which the power is transmitted from the water-wheel to the line-shaft by spur-gearing. Figs. 9 and 10 illustrate a further modification of the same, in which chains are used to transmit the power from the water-wheel to the line-shaft. Fig. 11 shows a modified arrangement for operating the adjustable shutter. Figs. 12 and 13 are detail views of an automatic water-feed mouth and shutter.

The same letters of reference indicate corresponding parts in all the figures.

Referring first more particularly to Figs. 1, 2, 3, 4, 5, and 6, A is the water-wheel revolving with its axle B in bearings $c'$ $c^2$, which are fixed near one end of the frame D, which consists of two strong side beams connected together, one on either side of the wheel.

E is the line or first-motion shaft of the mill, about which the frame D turns as a center, the water-wheel and frame being partly counterbalanced by the counter-balance F, fixed at the other end of the frame.

G G are the walls of the wheel-race, between which the frame and water-wheel can move up or down.

The line-shaft E revolves in bosses $d'$ $d'$, fixed to the sides of the frame, and these bosses form trunnions, on which the frame can turn, the trunnions fitting in bearings $e$ $e$, fixed to the walls G G.

H is the screw for raising or lowering the frame and water-wheel, the lower end $h'$ being jointed to a cross-bar $h^2$, fixed in the walls G G, or otherwise secured, and the upper part passing through a cross-piece $d^i$ of the frame D, above which is the nut $h^3$, by turning which the frame and water-wheel can be raised or lowered, as desired.

In order to more securely fix the water-wheel in any required position, its axle B is extended at each side and fits in bearings $b'$ $b'$ in the side walls G G. These bearings fit in frames $b^2$ $b^2$, (shown on an enlarged scale by Fig. 3,) built in the walls, which frames are arcs of a circle of which the line-shaft E is the center. Removable packing-blocks $b^3$ $b^3$ are filled in above and below the bearings $b'$ $b'$.

The water-wheel axle B and the line-shaft E are cranked at each side of the water-wheel, and are connected together by the two connecting-rods I' I², which transmit power and rotary motion from the water-wheel axle to the line-shaft, the cranks at one side of the water-wheel being by preference at about right angles to the cranks on the other side. By the water-wheel A being carried by the frame D, as above described, it can be raised or lowered so that (if a breast-wheel, as shown by Figs. 1 and 2) it will be clear of the tail-water in the time of floods, or if an under-shot wheel (to which my invention is more particularly applicable) it can be fixed in any required position, so as to be immersed just the proper depth in the stream.

When applying my invention to breast water-wheels, I prefer to make the end $d^2$ of the frame D near the water-wheel curved to conform with the outline of the wheel, and I provide a similarly-curved sliding shutter $d^3$, movable along guides on the frame to keep the water in the buckets. This shutter may be operated by a rack $d^4$ and pinion $d^5$, so that it can be raised or lowered as the position of the water-wheel is changed; or instead of a sliding shutter removable boards $d^6$ may be employed, as shown by Figs. 4, 5, and 6; or, as illustrated by Figs. 11, 12, and 13, the sliding shutter may be arranged to be moved automatically by the act of raising or lowering the water-wheel. This is accomplished by connecting the top of the sliding shutter $d^3$ to two chains $m$—one on either side of the wheel—these chains passing over guide-pulleys $n$ and $o$ to a point $p$, where they are secured to the lever-frame D, so that as the position of the water-wheel and frame D is changed the sliding shutter $d^3$ is automatically raised or lowered to suit.

The operation of the shutter will be obvious, the object being to maintain it in a certain relation to the feed-spout—that is, immediately below it—without regard to whether the frame be raised or lowered, so that the water issuing from the spout or raceway will be properly confined in the buckets adjacent to the spout, as well as those lower down. When the frame is depressed, for instance, the shutter is moved therein and raised in relation thereto, so that it practically remains in a fixed relation to the feed-spout and directs the water as it leaves the same. This adjustment may be performed by hand or automatically, in the latter case the cord passing from the upper end of the shutter over a fixed pulley and to a practically fixed point near the pivot of the frame, as before described, whereby movement of the frame automatically adjusts the shutter.

The mouth of the dam has a hinged water-chute $q$, which leads the water into a traveling chute $r$, provided with rollers $s$, this chute being hinged to the top of the sliding shutter $d^3$, so as to lead the water into the buckets of the water-wheel with the least possible amount of waste.

$t$ is a sluice for admitting water to the water-wheel when the latter is down at its lowest position.

In the example illustrated by Figs. 7 and 8 the cranks and connecting-rods $I' I^2$ are dispensed with, and rotary motion and power are transmitted from the water-wheel axle B to the line or first-motion shaft E by the three spur-wheels gearing together and marked $J'$ $J^2$ $J^3$, of which the wheel $J'$ revolves with the water-wheel. The wheel $J^2$ is fixed to and revolves with the line-shaft E, and the wheel $J^3$ is an idle-wheel carried by the shaft $j'$, and is only used in cases where the line-shaft is required to run in the same direction as the water-wheel.

In the example illustrated by Figs. 9 and 10 two chains $l\ l$—one on either side of the water-wheel—are employed to transmit the power and motion of the water-wheel A to the line-shaft E. These chains pass round suitable chain-toothed wheels $k'\ k^2$, fixed respectively on the water-wheel axle B and the line-shaft E, and the chains and wheels are by preference arranged inside the beams of the frame D, which for this purpose are made of a hollow rectangular form in cross-section and water-tight, so as to prevent the chains and wheels getting wet and oxidized by the water.

What I claim as my invention, and desire to secure by Letters Patent, is—

1. In combination, the supports G G, the frame D, pivotally supported thereby, the water-wheel A, an adjusting device at the rear end of the frame, and the removable blocks for rigidly supporting the water-wheel end of the frame from below, substantially as described.

2. In combination, the supports G G, the pivoted frame D, the water-wheel, the shaft B, the guides for receiving the journal-boxes $b'$, and the removable blocks $b^3$ for rigidly and adjustably supporting the water-wheel, substantially as described.

3. In combination, the supports G, the water-wheel, the adjustable shutter, and the pivoted frame D, said frame supporting the wheel and having an extension projecting forward beyond the axle to the front of the wheel, provided with seats for the adjustable shutter, which extends across in front of the wheel and rests with its edges in said seats to slide therein, substantially as described.

4. In combination, the supports G G, the pivoted frame D, the water-wheel, the movable shutter $d^2$, and the automatically-operating means for operating said shutter, substantially as described.

5. In combination, the supports G G, the water-wheel, the power-transmitting mechanism, and the frame D for pivotally supporting the wheel, said frame being hollow and water-tight and having contained therein the power-transmitting mechanism, substantially as described.

In testimony whereof I have signed my name in the presence of two subscribing witnesses.

HORTENSIUS COATES SIMPSON.

Witnesses:
  CHARLES BOSWORTH KETLEY,
  HERBERT WHITEHOUSE.